United States Patent Office 3,155,527
Patented Nov. 3, 1964

3,155,527
ADHESIVE AND METHOD OF PREPARATION
Merle J. Mentzer, Mokena, Ill., assignor to Corn Products Company, New York, N.Y., a corporation of Delaware
No Drawing. Filed June 21, 1962, Ser. No. 204,667
5 Claims. (Cl. 106—210)

The present invention relates to a new and improved alkaline setting adhesive which imparts water resistant or waterproofing characteristics to paper products, particularly to corrugated paper board. Such an adhesive after curing does not rehydrate when, for example, the paper boards which it binds together are immersed in water. More specifically, the present invention relates to a waterproofing composition comprising a starch polymer, an alkaline material, urea, formaldehyde, and water.

Various starch adhesives for making paper products have been described in several patents in the past. As examples of these patents are those of Jordan B. Bauer assigned to Stein-Hall bearing U.S. Patent Nos. 2,051,025, 2,102,937 and 2,212,557. In the process of these patents a carrier starch (prepared by gelatinizing starch in the presence of heat and caustic soda) and raw starch are the principal components for making non-waterproofing corrugated board. The primary function of the carrier starch is to hold the ungelatinized starch component in suspension and to impart desirable viscosity characteristics so that the adhesive can be applied on conventional corrugating machines. Caustic soda, used to gelatinize the carrier starch, in addition, functions to lower the gelatinization temperature of raw starch. In addition, to caustic, borax is added to increase the viscosity and fluidity of the adhesive and to improve its adhesiveness. Borax, also, causes the raw starch to gelantinize more rapidly. Thus, when the adhesive is applied to the tips of the corrugations and the liner comes in contact with the tips, heat is applied thereby readily gelatinizing the starch. By this "in situ gelatinization" a much stronger bond between the medium and liner is formed than when paste starch is used. The above-mentioned patents represent conventional means for making non-waterproof corrugated board.

There have been numerous attempts to make a starch adhesive formulation of the cooked "in situ" type which would have water resistance or waterproofing characteristics. Among the more common methods of imparting water resistance to paper products in use today, is the incorporation into the starch adhesive of a resin, such as, urea-formaldehyde. Though these agents impart some water resistance under alkaline conditions, most of them perform best in an acid medium. However, the presence of acid decreases the tack of the paste, making it difficult to form a good glue line between the fluted medium and the liner board. Furthermore, the gel point of the raw starch component is increased to 170° to 180° F. When using such water-proofing adhesives, it is necessary to reduce the speed of the corrugator from 400 to 500 feet per minute to about 150 feet per minute to allow more time for the starch to heat gelatinize.

For optimum performance of either a waterproofing or non-waterproofing adhesive the ratios of the pasted or carrier starch to raw starch, caustic to starch, and starch to water should be within certain limits. These limits have been well defined in the past and include: (1) gel point within the range of 142 to 155° F., (2) viscosity within the range of about 25 to 60 seconds (as determined in a Stein-Hall viscosity cup), (3) a starch to water ratio of about 1 to about 3 to 4, and (4) a ratio of carrier starch to raw starch of about 1 to 5. Applicant's new waterproofing adhesive possesses all of these desirable properties in addition to others, so that it can be readily applied on conventional corrugating equipment at normal operating speeds to produce waterproof board.

In addition, the adhesive of the present invention is capable of imparting its strong bond and waterproof characteristics to gluing operations in paper products other than corrugating processes wherein heat is applied. For example, an adhesive imparting water resistance is required, in many instances, by the bagging industry, in the formation of laminations, and in many other paper products.

An object of the present invention is to provide an adhesive which when used in the production of water-resistant corrugated board will form a bond which resists hydration when immersed in cold water for 24 hours.

Another object is to prepare a potential adhesive which sets rapidly at an elevated temperature so that water-resistant board can be made at an increased rate of production.

Another object is to prepare a potential adhesive under highly alkaline conditions so that the gel point of the raw starch portion of the mix is between about 142° to 155° F.

Another object is to prepare a potential waterproofing adhesive, which shows in addition to the aforementioned desirable characteristics, a long pot life and a stable viscosity.

Another object is to provide an adhesive composition capable of imparting water-resistance to paper products of any kind.

These and other objects as described hereinafter are provided for by the novel adhesive composition of this invention.

The present invention provides an adhesive composition which is comprised of gelatinized starch, ungelatinized starch, urea, formaldehyde, water, and an alkaline material present in sufficient quantity to provide the composition with a pH between about 10 and about 12.5.

Furthermore, the present invention provides a process for preparing an adhesive composition having water-resistant properties, which is comprised of forming a carrier portion by gelatinizing starch in an alkaline medium and cooling the resulting paste. The carrier portion is then mixed with a slurry comprised of ungelatinized starch, water, urea and formaldehyde. The resulting composition contains about 1 part of gelatinized starch, between about 3 and about 6 parts of ungelatinized starch, between about 0.5 and about 2.0 parts of urea, between about 0.25 and about 1.0 part of formaldehyde (or an equivalent amount of paraformaldehyde), between about 15 and about 25 parts of water, and sufficient alkaline material to afford the composition a pH between about 10.0 and about 12.5.

The present invention also provides a premixed dry blend comprised of about 4 parts of ungelatinized starch, about 1 part gelatinized starch, about 1.0 part of urea, about 0.5 part of paraformaldehyde, about 0.1 part of lime, and about 0.2 part of sodium carbonate, which when admixed with about 20 parts of water and agitated for at least about one hour, yields an adhesive composition having superior water-resistant characteristics.

The present invention is based upon the discovery that if urea and formaldehyde, as individual constituents rather than a resin, are incorporated in a standard corrugating adhesive, a superior waterproofing adhesive is obtained. It sets rapidly at high pH values and yet possesses a pot life of several hours. It is not known with certainty why the incorporation of urea and formaldehyde, as individual constituents in a starch adhesive, functions so effectively.

It is necessary to use a sufficiently strong alkaline material to give a pH to the adhesive in the range of at least between about 10 and about 12.5, the preferred range being about 11.5 to 12.0. A pH higher than about 12.5 may be detrimental since it can cause undesirable swelling of the granule starch either when the carrier is added to the raw starch slurry or when the adhesive is in storage tanks or the paste pans. Thus the critical upper limit of the alkaline concentration is the maximum amount that will not swell or gelatinize the granule starch before the glue line is formed. The upper and lower limits, with respect to the alkaline concentration to give the desired pH, vary with the type of alkaline material selected.

A variety of alkaline materials may be used to adjust the pH to the desired range; for example, sodium hydroxide, potassium hydroxide, trisodium phosphate, and mixtures of sodium carbonate and lime, or sodium carbonate and sodium hydroxide. However, it is preferred to use sodium hydroxide whether in solution (in which case proper water adjustment should be made) or in dry flake form.

The gel point of the adhesive may range from 142 to 155° F., the preferred range being between 144 and 148° F. It has been observed that the gel point of the adhesive of the present invention does not increase significantly with storage time, differing considerably from most water-resistant adhesives.

The viscosity of the adhesive measured in a Stein-Hall cup ranges from 25-60, preferably from 35-45 seconds.

Although it is not intended to limit the invention to any particular order of mixing it is preferable, as illustrated in Example I to prepare the carrier portion first and then combine it with the raw starch, urea, and formaldehyde.

The starches applicable in the process of the present invention include those normally used in the water-resistant adhesive trade such as, for example, corn, potato, waxy maize, grain sorghum, and tapioca, or mixture thereof, or modifications or derivatives thereof, having a fluidity less than about 20. However, the different starches may require different conditions, i.e., potato starch is more susceptible to caustic swelling thereby requiring use of less caustic.

It is more important to consider the ratio of urea to formaldehyde than the overall amount of urea and formaldehyde present. The mol ratio of urea (dry basis) to formaldehyde (gaseous form) should be at least about 2 to 1. For commercial operation, an excess of urea considerably minimizes, if not entirely eliminates the formaldehyde odor in the working area.

Some of the requirements of a water-resistant adhesive suitable for the corrugating industry are as follows:

(1) Preparation of the adhesive should be relatively simple, i.e., easily prepared in conventional equipment.

(2) Preparation should be relatively inexpensive.

(3) When used as a corrugating adhesive, the pH should be high to afford the raw starch component a low gelatinization temperature so that the corrugating machine may be operated at efficient speeds.

(4) The adhesive should be light in color, preferably white.

(5) The adhesive should be compatible with regular non-waterproof adhesives in order to obtain particular degrees of water-resistance as required by the paper industry.

(6) The viscosity of the adhesive should be stable so that a predetermined amount may be evenly applied to the product.

(7) The adhesive must produce a saleable, highly water-resistant corrugated board.

Until discovery of the product of the present invention and the process for the preparation thereof, no adhesive possessed all of the above-listed attributes. For example, it is well-known to the corrugating industry that a resorcinol adhesive provides excellent water-resistance and strong bonding, but such an adhesive is of an objectionable dark brown color, has a high gelatinization temperature necessitating slow machine speeds, and costs at least 1½ times as much as the product of the present invention.

In the following operating examples which clearly illustrate the invention, all parts are given in parts by weight and all temperatures are in degrees Fahrenheit. The portions of water added are at room temperature unless otherwise specified. The viscosity determinations were carried out by use of the standard Stein-Hall cup. The weights of all materials are on a commercial weight basis. The pregelatinized starch of Examples V and VIII is gelatinized roll-dried starch, however, spray-dried or drum-dried gelatinized starch is equally applicable.

*Example 1*

This example sets forth a preferred embodiment of the invention. A conventionally prepared corrugating paste is modified by the addition of urea and paraformaldehyde to the uncooked portion in order to produce a finished adhesive that is waterproof.

The carrier portion of the adhesive was prepared as follows:

| | Parts |
|---|---|
| Water | 325 |
| Unmodified corn starch | 100 |
| Caustic soda | 15 |

These ingredients were combined under agitation, heated to 160° F. with live steam, and held at that temperature for 15 minutes. Three hundred thirteen parts of cold water (about 70°) were then added and the paste was agitated until the temperature fell below about 118°.

During this time, the secondary or bottom portion of the adhesive was prepared as follows:

| | Parts |
|---|---|
| Water (100° to 110°) | 1585 |
| Paraformaldehyde (equivalent amount of formaldehyde solution can be used) | 50 |
| Urea | 100 |
| Unmodified corn starch | 500 |

These ingredients were mixed until the solids were well dispersed. The cooled carrier portion (118° or less) was then added slowly to this portion with violent agitation. It takes about 20 minutes for this operation.

The finished adhesive had the following properties:

| | |
|---|---|
| Color | White. |
| Viscosity (as measured by a Stein-Hall cup) | 37 seconds. |
| Viscosity after 2 hours agitation | 47 seconds. |
| pH | 11.7. |
| Gelatinization range | 146°–148°. |

When this adhesive was held overnight with no agitation, the viscosity increased. Mild agitation reduced the viscosity so that the adhesive was still useful.

Corrugated board produced with this adhesive possessed excellent waterproof bond.

The test in Examples I–X for determining the waterproof bond is similar to that of the U.S. Government V3C Specification for corrugated board. A 3 x 6 inch sample of the corrugated board is immersed in a trough containing sufficient tap water to completely cover the sample. Fresh water continuously flows through the trough. After 24 hours have elapsed, the sample is removed from the trough and evaluated for water-resistant bond by tearing the liner from the fluted medium. The amount of fiber that adheres to the tips of the flutes determines the rating of the water resistance and adhesive bond:

| | |
|---|---|
| 90–100% fiber pull | Excellent. |
| 60–80% fiber pull | Good. |
| 30–60% fiber pull | Fair. |
| 0–30% fiber pull | Poor. |

If the liner and fluted medium separate before 24 hours of immersion have passed, the rating is "none."

This example shows several of the advantages of the instant invention in waterproof corrugating adhesives. They are:

(a) A white color.
(b) A low gelatinization range that allows the corrugating machine to be operated at normal speed.
(c) Excellent waterproof bond.
(d) Easily prepared in conventional equipment.
(e) The adhesive is still useful after a prolonged period with no agitation (other waterproof corrugating adhesives become irreversibly thickened upon standing with no agitation).
(f) Due to an excess of urea over the mole ratio needed for polymerization, only a slight formaldehyde odor was apparent.
(g) The cost of this adhesive is 40% that of a 7% resorcinol adhesive.

*Example II*

This example is given to show the properties of a corrugating adhesive containing 7% resorcinol. This adhesive is presently considered by the corrugating industry as the best waterproof adhesive available.

The primary or carrier portion of this adhesive was prepared as follows:

| | Parts |
|---|---|
| Water | 525 |
| Unmodified corn starch | 100 |
| Resorcinol | 42 |
| Caustic soda | 10 |

These ingredients were combined under agitation, heated to 140° and held at that temperature for 10 minutes. Two hundred and fifty parts of cold water (about 70° F.) was then added and the paste was agitated until the temperature fell below about 118°.

During this time, the secondary or bottom portion of the adhesive was prepared as follows:

| | Parts |
|---|---|
| Water | 1040 |
| Formaldehyde (37% solution) | 75 |
| Unmodified corn starch | 500 |

The finished adhesive had the following properties:

| | |
|---|---|
| Color | Dark brown. |
| Viscosity | 23 seconds. |
| Viscosity after 2 hours agitation | 24 seconds. |
| pH | 10.5. |
| Gelatinization range | 160–162°. |

When this adhesive was held overnight with no agitation it increased extremely in viscosity so that it was no longer useful. Moderate agitation did not reduce this viscosity to any great extent.

Corrugated board produced with this adhesive possessed excellent waterproof bond.

This example shows the disadvantages of one of the corrugating industry's waterproof adhesives. They are:

(a) A brown color.
(b) A high gelatinization range necessitating a reduction in machine speed.
(c) The adhesive must be used relatively soon after preparation. It cannot be held overnight for use on the next day.
(d) The cost of this adhesive is relatively high.

The adhesive has its main advantage in the fact that it produces waterproof board of excellent quality.

*Example III*

This example shows the properties of a waterproof corrugating adhesive prepared with a 12% blend containing 83% corn starch and 17% calcium cyanamide and 6% urea-formaldehyde resin. This waterproof adhesive was prepared in a full scale Pratt corrugating adhesive mixer and used to produce commercial corrugated boards. This adhesive was prepared as follows:

In the upper tank of the adhesive mixer the following ingredients were mixed:

| | | |
|---|---|---|
| Water | gal | 78 |
| Slightly acid modified corn starch (7 fluidity) | lbs | 200 |
| Caustic soda | lbs | 30 |

This mixture was cooked to 160° with live steam and held at that temperature for 15 minutes. Seventy-five gallons of cooling water (about 80°) was added and the paste was mixed until the temperature fell to below 118°.

During this time the secondary or bottom portion of the adhesive was prepared in the lower tank as follows:

| | | |
|---|---|---|
| Water | gal | 360 |
| Clay | gal | 100 |
| Borax (decahydrate) | lbs | 20 |
| A blend containing 83% corn starch and 17% calcium cyanamide | lbs | 200 |
| Unmodified Milo starch | lbs | 1400 |
| Urea-formaldehyde resin | lbs | 245 |

The above ingredients were mixed until the solids were well dispersed and the carrier portion was added as in Example I.

The finished adhesive had the following properties:

| | |
|---|---|
| Color | Dark grey. |
| Viscosity | 37 seconds. |
| Gelatinization range | 149°–151°. |

When this paste was held overnight with no agitation, results similar to those of Example II were seen.

Corrugated board was prepared using this adhesive at machine speeds of 275 ft./minute. Waterproof bond of this board was only fair. Decreasing the machine speed to 180 ft./minute produced corrugated board with excellent waterproof bond.

This example shows several disadvantages of this type of corrugating paste. They are:

(a) A dark grey color.
(b) Relatively complex preparation procedures.
(c) Inability to produce satisfactory waterproof corrugated board at standard machine speed.
(d) The adhesive cannot be held overnight for use the next day.
(e) The cost of this adhesive, although lower than that of a 7% resorcinol adhesive, is relatively high.

The main advantage of this paste is that it can be mixed with non-waterproof adhesive without the usual starch borax resin reaction occurring and causing excessive thickening. This is probably due to the calcium cyanamide present.

*Example IV*

This example shows how this invention is useful in preparing waterproof corrugating adhesives with unmodified milo starch. This waterproof adhesive was prepared in the same equipment as the adhesive described in Example III.

This adhesive was prepared as follows:

In the upper tank of the adhesive mixer the following ingredients were mixed:

| | | |
|---|---|---|
| Water | gal | 50 |
| Unmodified Milo starch | lbs | 100 |
| Caustic soda | lbs | 16 |

The mixture was cooked to 160° with live steam and held at that temperature for 15 minutes. Fifty gallons of cooling water (about 80°) was added and the paste was mixed until the temperature fell below 118°.

During this time the secondary or bottom portion of the adhesive was prepared in the lower tank as follows:

| | | |
|---|---|---|
| Water | gal | 160 |
| Paraformaldehyde | lbs | 50 |
| Clay | lbs | 50 |
| Urea | lbs | 100 |
| Unmodified Milo starch | lbs | 800 |

The above ingredients were mixed until the solids were well dispersed and the carrier portion was added as in Example I.

The finished adhesive had the following properties:

Color _____ White.
Viscosity _____ 31 seconds.
Gelatinization range _____ 140°–141°.

When this paste was held overnight with no agitation, results similar to those in Example I were observed.

Corrugated board was prepared using this adhesive on the same machine that was used in Example III. Excellent waterproof bond was formed at speeds at 300 ft./minute.

This example illustrates, in accordance with the instant invention, the preparation of waterproof corrugated board of excellent quality at normal and fast machine speeds. In addition, all of the advantages enumerated in Example I were also attained by this method.

*Example V*

This example illustrates the preparation of a waterproof corrugating adhesive using only the lower tank of a Pratt corrugating adhesive mixer with a pregelatinized starch as the carrier portion of the adhesive. Such an adhesive is prepared as follows:

To 1600 parts of water at 120° in the lower mixing tank add the following ingredients with agitation.

|  | Parts |
|---|---|
| Pregelatinized starch (for ease in dispersion this may be added to cold water and heated to 120°) | 100 |
| Caustic soda (flake form is preferred) | 16 |

Mix the above at 120° for 20 minutes then add the following ingredients:

|  | Parts |
|---|---|
| Cool water (about 70° to 80°) | 750 |
| Paraformaldehyde | 35 |
| Urea | 70 |
| Starch (unmodified or slightly acid modified starch can be used. The unmodified pearl form is preferable due to ease of dispersion) | 450 |

This adhesive is mixed until smooth.

The properties of both the finished adhesive and corrugated board produced with this adhesive are similar to those found in Example I. This adhesive, however, is more stable in viscosity.

*Example VI*

This example demonstrates the applicability of a slightly acid modified starch in the carrier portion of the adhesive. The adhesive is prepared in accordance with Example V except that 100 parts of a slightly acid modified starch having a fluidity of 7, is used in place of 100 parts of pregelatinized starch. The properties of both the finished adhesive and corrugated board produced with this adhesive are similar to those of Example I. This adhesive, however, is more stable in viscosity. The advantages enumerated in Example I are equally applicable to the present example.

*Example VII*

This example illustrates the preparation of a waterproof corrugating adhesive in a single mix step as in Example V, except that an unmodified starch is used as the carrier portion of the adhesive. Such an adhesive is prepared as in Example V except that 80 to 90 parts of an unmodified starch are used in place of 100 parts of pregelatinized starch. The properties of both the finished adhesive and corrugated board produced with this adhesive are similar to those found in Example I. This adhesive, however, is slightly more stable in viscosity. The advantages enumerated in Example I apply to this example also.

*Example VIII*

This example provides a formula for preparing a preblended dry mix which, when mixed with water, yields an adhesive composition having water-resistant properties.

Sixty-nine parts of unmodified corn starch is blended with 16 parts of pregelatinized starch, 2 parts of lime, 3 parts of sodium carbonate, 14 parts of urea, and 7 parts of paraformaldehyde.

The resulting mixture may be packaged and sold to the consumer. When the user is ready to prepare the adhesive for application, the dry mix is admixed with about 233 parts of water and agitated for about one hour. The adhesive composition is then ready for application.

*Example IX*

This example shows the properties of an alkaline waterproof corrugating adhesive prepared with a commercially available urea-formaldehyde resin.

The carrier or primary portion of the adhesive was prepared as follows:

|  |  |
|---|---|
| Water | 462 parts. |
| Unmodified corn starch | 80 parts. |
| Calcium hydroxide | 12 parts. |
| Caustic soda | 4 parts (dissolved in 16 parts water). |

These ingredients were combined under agitation, heated to 156° and held for 15 minutes. One hundred and fifty three parts of cooling water (70°–80°) were added and the paste was agitated until the temperature fell to about 118°.

During this time the secondary or bottom portion of the adhesive was prepared as follows:

|  | Parts |
|---|---|
| Water | 800 |
| Urea-formaldehyde resin (30% solids) | 120 |
| Sodium tri-metaphosphate | 12 |
| Unmodified corn starch | 400 |

These ingredients were combined under agitation until the solids were completely dispersed. The carrier portion was then added as in Example I.

The properties of the finished adhesive are described below:

| Color | White. |
|---|---|
| Viscosity (as Example I) | 25 seconds. |
| pH | 11.8. |
| Gelatinization range | 143–144. |

Corrugated board prepared using this adhesive at machine speeds of 225 ft./minute had far to good waterproof bond.

This adhesive thickened irreversibly when agitation was stopped for an extended period of time.

A strong formaldehyde odor was apparent at both the adhesive mixer and the corrugating machine.

The cost of the adhesive prepared in accordance with Example IX slightly exceeds twice the cost of the adhesive prepared in accordance with the present invention.

*Example X*

This example demonstrates the preparation of a dry blended product with starch for use in waterproof corrugating applications.

A dry blend of corn starch, paraformaldehyde, and urea is prepared so that the mole ratio of urea to formaldehyde is at least 2 to 1 and preferably substantially higher. Either unmodified or slightly acid modified starch can be used. The amount of starch may vary from about 10% of the blend to about 90% of the blend. This blended product is then used to replace part or all of the starch used in the secondary or bottom portion of a corrugating adhesive.

Adhesives were prepared according to Examples I, V, VI, and VII by substituting a blend consisting of 7 parts unmodified corn starch, 2 parts urea and 1 part paraformaldehyde for a sufficient amount of the respective starches used in the secondary or bottom portion of the adhesive so that the amount of urea and paraformaldehyde was the same as in the original adhesive formulations.

The finished adhesive and corrugated board prepared using these adhesives were similar in properties and advantages to those listed in the respective examples.

It is known throughout the adhesive art, and particularly in the corrugating field, that the various demands and available operating conditions greatly influence the applicability and capability of a particular adhesive formulation to perform as desired. However, as has been shown above, the adhesive composition of the present invention performs well under varying conditions and in all instances costs a great deal less to prepare, thereby providing a water-resistant adhesive composition of wide scale economic value and with properties far superior to those previously available in the art.

While the invention has been described with reference to certain specific embodiments thereof, it is intended that such matters be purely illustrative for the purpose of clarifying the invention, and the invention is in no sense considered limited thereto. Numerous modifications and equivalents of the present invention will be apparent to those skilled in the art.

I claim:

1. An adhesive composition capable of imparting water resistance to adhesive bonds in paper products comprising about 1 part of gelatinized starch as carrier, between about 3 and 6 parts of ungelatinized starch, between about 0.5 and about 2.0 parts of urea, between about 0.25 and about 1.0 part of a compound selected from the group consisting of formaldehyde and paraformaldehyde, water in an amount between about 15 and about 25 parts, said composition having a pH between about 10 and about 12.5 and being capable of setting upon heating.

2. An adhesive composition as defined in claim 1 containing an alkaline material selected from the group consisting of sodium hydroxide, potassium hydroxide, trisodium phosphate, a mixture of sodium carbonate and lime, and a mixture of sodium hydroxide and sodium carbonate.

3. A process for preparing an adhesive composition having water resistant properties which comprises forming a carrier portion by gelatinizing starch in an alkaline medium and cooling the resulting paste, mixing said carrier portion with a slurry comprised of ungelatinized starch, water, urea, and formaldehyde, the resulting composition containing about 1 part of gelatinized starch between about 3 and 6 parts of ungelatinized starch, between about 0.5 and about 2.0 parts of urea, between about 0.25 and about 1.0 part of formaldehyde, between about 15 and about 25 parts of water and having a pH between about 10.0 and about 12.5.

4. A single mix process for preparing an adhesive composition having water resistant properties which comprises forming a carrier portion by gelatinizing starch in an alkaline medium and cooling the resulting paste, adding to said carrier portion ungelatinized starch, water, urea, and formaldehyde, the resulting composition containing about 1 part of gelatinized starch, between about 3 and about 6 parts of ungelatinized starch, between about 0.5 and about 2.0 parts of urea, between about 0.25 and about 1.0 part of formaldehyde, between about 15 and about 25 parts of water and having a pH between about 10.0 and about 12.5.

5. A dry blend which when mixed with water yields an adhesive composition having water resistant properties, comprising about 1 part of pregelatinized starch, about 4 parts of ungelatinized starch, about 1 part of urea, about 0.5 part of paraformaldehyde, and about 0.2 part of sodium carbonate and about 0.1 part of lime.

References Cited in the file of this patent

FOREIGN PATENTS

| | | |
|---|---|---|
| 772,479 | Great Britain | Apr. 17, 1957 |
| 807,505 | Great Britain | Jan. 14, 1959 |